United States Patent Office 3,198,822
Patented Aug. 3, 1965

3,198,822
QUATERNARY AMMONIUM SULFATES AND SULFONIC ACID SALTS
Hans S. Mannheimer, Toms River, N.J., assignor to said Mannheimer and John J. McCabe, Jr., as joint venturers
No Drawing. Filed Oct. 13, 1961, Ser. No. 144,850
8 Claims. (Cl. 260—458)

This invention relates to novel compositions and to methods for making them, and is directed to methods for making and to novel derivatives of certain amphoteric, water-soluble compounds characterized by having at least one

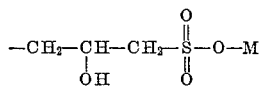

radical attached directly to a nitrogen thereof, with M being either hydrogen, sodium, potassium or other alkali metal or other cation equivalent therefor in the art of water soluble, amphoteric compounds. Said novel derivatives, hereinafter known as compounds of Formulas IVA and IVB, may be defined as detergent sulfonic acid or sulfate salts of said amphoterics.

The amphoterics from which compounds of the present invention may be derived are themselves useful as surface active agents, have good foaming characteristics and find use as general purpose detergents, textile treating, emulsifying and emulgating agents, and also as components in cosmetics and shampoos and are of the following formulas:

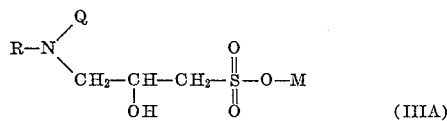 (IIIA)

and

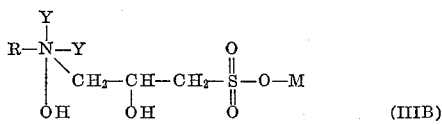 (IIIB)

in which R is a hydrocarbon radical of 6–24 carbon atoms and is aliphatic, saturated or unsaturated, straight or branch chain, cycloaliphatic, or aliphatic-aromatic with the aliphatic portion attached to an aromatic nucleus being of at least 3 carbon atoms; each Y is an (a) aliphatic hydrocarbon radical of 1–6 carbon atoms or (b)

$$-R_1-O-(R_1-O)_x-H$$

radical, with $R_1$ being an alkylene group of 2–4 carbon atoms and $x$ being 0–15; Q is hydrogen or (a) or (b) or

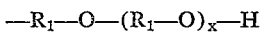

Said reactant compounds of Formulas IIIA and IIIB, some of which are disclosed in my copending application Ser. No. 120,929 filed June 30, 1961, may be produced by following the methods disclosed in the aforesaid application. One of the reactants for producing reactant compounds of Formulas IIIA and IIIB is my sultone described and claimed in my copending application Ser. No. 120,921 filed June 30, 1961, and now U.S. Patent 3,100,779, and being of the following formula:

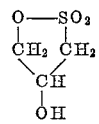

and the other reactants being compounds of the following formulas:

 (IA)

and

 (IB)

Compounds of said Formulas IA and IB as well as the methods for producing them are so well known to the art that there is no need to list them or to set forth methods for their production.

My sultone employed as a reactant herein may be prepared by employing the procedure set forth in the following Example A, all parts being given by weight unless otherwise specified.

Example A

About 104 parts of sodium meta bisulfite $Na_2S_2O_5$ were charged into a glass flask and then there was also charged into said flask 600 parts of water into which was dissolved 1 cc. of a 50% aqueous solution of NaOH thereby to dissolve said sodium meta bisulfite therein. The solution was then heated to about 90° C. and maintained at that temperature for a period of about 15 minutes thereby to convert substantially all of the sodium meta bisulfite to sodium acid sulfite ($NaHSO_3$). The reactant solution of sodium acid sulfite was cooled to about 28° C. and by slow additions 101 parts of epichlorhydrin was added thereto with constant stirring over a 45 minute period, and the temperature of the mass, through said period was controlled by external cooling thereby to maintain the temperature thereof at about 47°–50° C. throughout said period. Thereafter, and for the next 2½ hours, stirring of the mass was continued and its temperature maintained at 47°–50° C. Then with or without a reflux condenser coupled with said flask, the mass therein was heated to boiling and maintained in that condition for a period of about 1 hour. Then the mass in said flask is cooled to room temperature, is hereinafter known as Mass A, and consists essentially of an aqueous solution of the novel sultone, whose structural formula is hereinbefore set forth, and NaCl by-product.

The aforesaid sultone may be reacted with compounds of Formulas IA and IB respectively in the mole proportion of about 1–2 moles of and preferably about 1.2–1.8 moles of sultone to 1 of said compounds of Formula IA or IB. Said reaction is preferably carried out in an aqueous medium and with the use of external heat to provide an aqueous solution of the respective compounds which are internal salts of the following respective formulas:

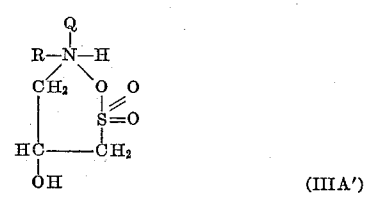 (IIIA′)

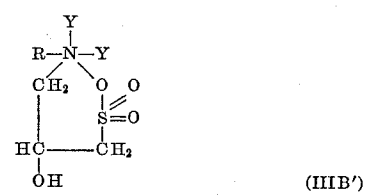 (IIIB′)

The aforesaid reaction is carried out under acidic conditions due to the fact that my novel sultone imparts a pH below 7 to said aqueous medium carrying it and the other reactant, and the yields of said internal salts is greater than 60% of theoretical.

When a small quantity, as for example 1 cc. of said aqueous solution of a compound of Formula IIIA' or IIIB' is added to 100 cc. of clear tap water and shaken therewith, there is a change from clear to cloudy. This indicates their lack of water-solubility in low concentration in which said compounds normally would be used, as surface active agents. The structures thereof may be changed thereby to convert and render them water-soluble, in low concentrations, as well as high concentrations, amphoteric and further characterized by having good surface activity, detergent and wetting properties and useful in shampoos, cosmetics, in the fields of treating of textiles, etc.

For the aforesaid purposes, the novel compounds of Formulas IIIA' and IIIB' may under alkaline conditions in an aqueous medium be heated thereby to convert them into said water-soluble amphoterics of Formulas IIIA and IIIB having the other foregoing properties which are soluble in low and high concentrations in an aqueous medium whose pH may be as low as 1 and as high as 14.

The alkaline agent preferably employed to render said aqueous medium alkaline is an alkali metal hydroxide, such as NaOH, KOH or the like and the amount of said agent is preferably at least about 1 mole proportion thereof per mole proportion of the sultone employed in the production of said compounds of Formula IIIA' or IIIB' in said aqueous medium.

Using the foregoing procedure but employing as amine reactants compounds of Formula IIIA but wherein Q is

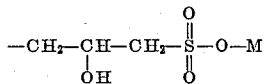

there is first produced the internal salt of the following Formula IIIA''.

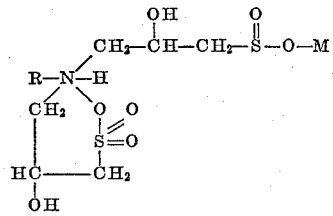

which is converted to a compound of Formula IIIA, wherein Q is

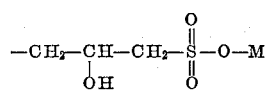

by employing the heating under alkaline conditions procedure as hereinbefore set forth for the conversion of the internal salts to external salts.

The following are novel illustrative methods for producing illustrative compounds which may be employed as reactants for the production of the novel compounds of this invention.

*Example 1*

Said entire Mass A which is an aqueous solution of about 138 parts (1 mole) of my sultone, in Example A herein is heated to 80° C. and while at that temperature there are added with stirring 185 parts (1 mole) of lauryl amine of the following formula:

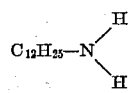

The resultant mass is then, while being stirred, allowed to stand overnight in a room whose temperature is 20° C. The next morning, the mass which has cooled to 20° C., while stirred, is heated to and maintained at 80° C. for about 3 hours, whereby there is produced an aqueous solution having a pH below 7 of a compound of the following formula:

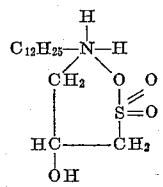

The 88 parts of a 50% aqueous solution of NaOH is added slowly to said entire aqueous mass after said 3 hour period while constant stirring still is maintained and the entire mass is heated to and then maintained at a temperature of 93°–95° C. for a period of about 3 hours thereby to provide an aqueous solution hereinafter known as Solution 1 consisting essentially of water in which are dissolved the NaCl by-product and amphoteric Reactant 1 of the following formula:

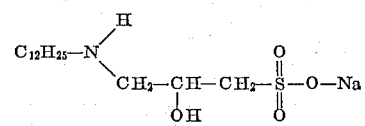

Said amphoteric Reactant 1 is water-soluble even in very low concentrations as evidenced by adding 1 cc. of siad Solution 1 to 100 cc. of water, which remain clear after said addition.

*Examples 2–4*

Employ the same procedure and components as those of Example 1 but instead of employing lauryl amine as a reactant substitute 1 mole of the following respective reactants:

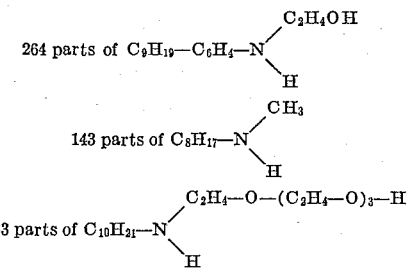

whereby the internal salts thereof similar to that of Example 1 are first produced and then are converted to the external salts which are amphoteric Reactants 2, 3, and 4 of the following respective formulas:

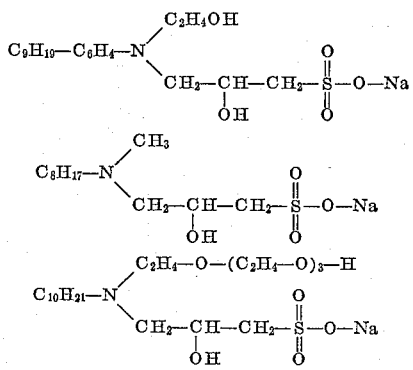

*Examples 5–7*

Employ the same procedure and components as those of Example 1, except for the 1 mole of the lauryl amine substitute 1 mole of each of the following reactants:

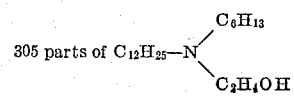

262 parts of $C_9H_{19}-C_6H_4-N\begin{smallmatrix}CH_3\\C_2H_5\end{smallmatrix}$ 435 parts of $C_{10}H_{21}-N\begin{smallmatrix}CH_3\\C_2H_4-O-(C_2H_4-O)_5-H\end{smallmatrix}$ whereby the internal salts of general Formula IIIB' are first formed and then converted into the amphoteric Reactants 5–7 of the following respective formulas:

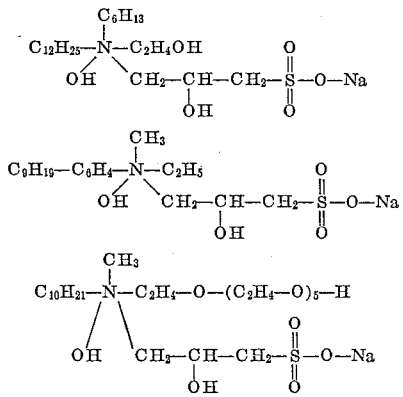

Example 8

The entire aqueous solution of Example 1 known as Solution 1 and containing approximately 300 parts of amphoteric Reactant 1 and the NaCl by-product which may or may not be separated therefrom by the use of selective solvents, is treated with a weak solution of an acid such as hydrochloric acid to reduce the pH thereof to approximately 7 measured electrically. Then to said solution is added said entire Mass A of Example A herein and the resultant mass which is now acidic is treated in the same manner as the resultant mass of Example 1 thereby to produce the following internal salt:

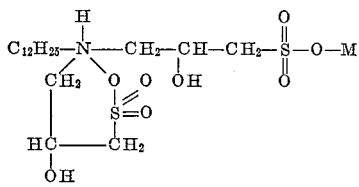

which is treated with caustic soda and heated in the same manner as in the internal salt of Example 1, thereto to convert it into the following amphoteric Reactant 8:

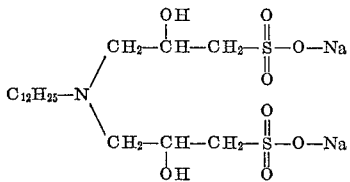

Examples 9–on

Employ the same procedure and components as those of Example 1 herein except that for the 1 mole proportion of lauryl amine, there may be substituted about .6 to 1 mole proportion of any other compound of Formula IA or IB, respectively, there may be produced literally hundreds of compounds of the type illustrated by amphoteric Reactants 1–8 herein, and may differ therefrom in the R and/or Q and/or Y radicals thereof.

All of said amphoterics of Examples 1–8 and 9–on are water-soluble, surface active amphoterics having excellent water-solubility at high as well as very low concentrations and in aqueous solution having good foaming properties and find the uses hereinbefore set forth, and may be employed as reactants for the production of novel compounds of this invention.

Prior to this invention water-soluble anionic detergent sulfonic and sulfonate salts have been known and used. In general they are relatively cheap when compared with the cost of compounds of Formulas IIIA and IIIB. In addition said anionic detergent sulfonic acid and sulfate salts have such a high toxicity as determined by standard "LD50 toxicity test by ingestion of a single dose" as to require the use of warning labels, and also have the further disadvantage that when employed as components of shampoos cause stinging of the eyes and sometimes irritation of the skin when such shampoos are used and water solutions thereof accidentally reach the eyes.

Examples of classes of said anionic detergent sulfonate and sulfate salts, known hereinafter as compounds of Formula II, are designated as $G-M_1$, with $M_1$ being an alkali metal and G being:

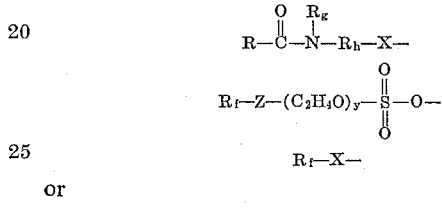

or

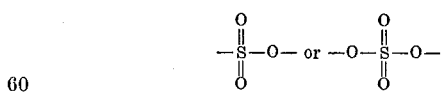

wherein R is as before defined, $R_f$ is an aliphatic, saturated or unsaturated hydrocarbon radical of 6–20 carbon atoms or an aliphatic-aromatic hydrocarbon radical with a maximum of 20 carbon atoms and having at least 6 carbon atoms in the aliphatic portion thereof and is preferably an alkly or an ethylenically unsaturated aliphatic hydrocarbon radical of 6–20 carbon atoms or an alkyl substituted mononuclear aromatic radical having a maximum of 20 carbon atoms, wherein the alkyl portions are of at least 6 carbon atoms; $R_g$ is hydrogen, an alkyl radical of 1–8 carbon atoms, an hydroxy alkyl radical of 2–8 carbon atoms or 1–15 mole alkylene oxide adducts of the available hydroxy groups in said hydroxy alkyl radicals, or alkyl ether group of 2–8 carbon atoms having at least 1 oxygen linkage therein and otherwise being hydrocarbon; $R_h$ is alkylene, aromatic, or aromatic-aliphatic hydrocarbon group of 1–12 carbon atoms, or hydroxy alkylene, or 1–15 mole alkylene oxide adduct of available hydroxy groups in said hydroxylalkylene group, aliphatic unsubstituted or hydroxy substituted ether group having at least one oxygen linkage therein, with said aromatic group preferably being phenylene; $R_k$ is an alkylene group of 1–12 carbon atoms, a hydroxy alkylene group of 2–12 carbon atoms, a 1–15 mole alkylene oxide adduct of said hydroxy alkylene group, or an aliphatic unsubstituted or hydroxy substituted ether group having at least 1 oxygen linkage therein; Z being oxygen or sulfur; X being $$-\underset{\underset{O}{\|}}{\overset{\overset{O}{\|}}{S}}-O- \text{ or } -O-\underset{\underset{O}{\|}}{\overset{\overset{O}{\|}}{S}}-O-$$

and y being 1–10.

In the course of my experimentations, I have discovered that said amphoterics of Formulas IIIA and IIIB could be reacted with anionic surface active agents, which are water-soluble detergent sulfonic acid salts and sulfate salts to produce water soluble reaction products of Formulas IVA and IVB and having the following unexpected combination of properties: (1) they are less expensive than the compounds of Formulas IIIA and IIIB employed; (2) they have wetting properties somewhat less than that of the reactants so that they have a lesser tendency to leach out natural components in hair; (3) notwithstanding the general rule that the greater the size of the molecule the less it will foam, they unexpectedly exhibit said better foaming and foam stability even at pH's in the range of 6.5 to 8; (4) they unexpectedly are of such low toxicity that no warning labels are required as determined by said "LD50 toxicity by ingestion of a single dose," and they unexpectedly are substantially non-stinging to the eyes and non-irritating to the skin in the same concentrations as the lowest concentrations that either the compounds of Formulas IIIA and IIIB or said anionic detergents would cause stinging of the eyes and/or irritation of the skin.

According to this invention, there is first prepared an aqueous solution of (a) a compound of Formulas IIIA and IIIB together with (b) one or a combination of two or more anionic compounds of Formula II, with the mole ratio being preferably 1–1, but may be in the mole ratio of 2 of (a)–1 of (b) to 2 or (b)–1 of (a). Then the aqueous solution which has a pH of 9 or more is heated to about 40°–50° C. or above and while being maintained at such elevated temperature there is slowly added thereto a weak solution of an acidic agent, such as phosphoric, citric and preferably hydrochloric or hydroxy acetic acid under constant stirring conditions until the pH is decreased to about 8 or below to 7 for example. In this reaction, the quaternary hydroxy of the compound of Formula IIIB combines with $M_1$ of said anionic compounds $G\text{-}M_1$ and is replaced by G thereof thereby to provide "G" salts of compounds of Formula IIIB, which salts are novel compounds of this invention and of the following Formula IVB, or when the reactant is not quaternary, as compounds of Formula IIIA, the $M_1$ of $G\text{-}M_1$ is replaced by a compound of Formula IIIA and also an addition of hydrogen thereby to provide "G" salts of compounds of Formula IIIA which salts are also novel compounds of this invention and of the following Formula IVA:

$$\begin{array}{c} Q \\ R-N \\ / \mid \\ H \quad G \end{array} \quad \begin{array}{c} O \\ \parallel \\ CH_2-CH-CH_2-S-O-M \\ \mid \quad \parallel \\ OH \quad O \end{array} \quad (IVA)$$

$$\begin{array}{c} Y \\ R-N-Y \\ \mid \\ G \end{array} \quad \begin{array}{c} O \\ \parallel \\ CH_2-CH-CH_2-S-O-M \\ \mid \quad \parallel \\ OH \quad O \end{array} \quad (IVB)$$

One of the specific methods which is preferably employed in carrying out an aspect of this invention is to prepare an aqueous solution containing a predetermined amount of compound of Formula IIIA or IIIB. Then a predetermined amount of compound $G\text{-}M_1$ is dissolved in water in a separate container. The solutions are combined and while being constantly stirred and heated to and maintained at about 45° C. there is slowly added thereto a weak aqueous solution of hydrochloric acid until the pH thereof is approximately 7.

The following are specific examples given merely by way of illustrating the present invention and are not to be taken by way of limitation, all parts being by weight unless otherwise specified.

*Example 1–IV*

Into a reaction vessel, there is charged an aqueous solution of 175 parts of Reactant 1 in about 300 parts of water. While being constantly stirred there is added thereto an aqueous solution of 400 parts of sodium salt of lauroyl monoethanolamide sulfate:

$$\begin{array}{c} O \quad N \\ \parallel \quad \mid \\ C_{11}H_{23}-C-N-C_2H_4-O-S-O_3-Na \end{array}$$

in 600 parts of water. Stirring is continued and the mass is heated to approximately 45° C. While being maintained at that temperature there is slowly added thereto weak hydrochloric acid solution until the pH thereof decreases to approximately 7. The resultant product is essentially an aqueous solution of the novel reaction product, hereinafter known as 1–IV of the following formula:

$$\begin{array}{c} H \\ \mid \\ O \quad H \quad C_{12}H_{25}-N-H \quad O \\ \parallel \quad \mid \quad \mid \quad \parallel \\ C_{11}H_{23}-C-N-C_2H_4-O-S-O_3 \quad CH_2-CH-CH_2-S-O-Na \\ \mid \quad \parallel \\ OH \quad O \end{array}$$

Employ the same procedure as that set forth in Example 1–IV, but employ the components set forth in the following Examples 2–IV to 21–IV-on thereby to obtain aqueous solutions of the following novel reaction products 2–IV to 21–IV-on which are additional illustrative examples of some of the novel reaction products of this invention.

*Examples 2–IV—5–IV*

175 parts of Reactant 1 in 300 parts of water. 400 parts of $$\begin{array}{c} O \quad CH_3 \\ \parallel \quad \mid \\ C_{11}H_{23}-C-N-C_2H_4-SO_3-Na \end{array}$$

in 600 parts of water, 600 parts of $$C_9H_{19}-C_6H_4-O-(C_2H_4O)_3-SO_3-Na$$

in 800 parts water, 400 parts of $$\begin{array}{c} O \quad H \\ \parallel \quad \mid \\ C_{11}H_{23}-C-N-C_6H_4-SO_3-Na \end{array}$$

in 600 parts of water, and 450 parts of $$\begin{array}{c} O \quad C_2H_4OH \\ \parallel \quad \mid \\ C_{17}H_{23}-C-N-C_2H_4-O-SO_3-Na \end{array}$$

respectively there are provided respective compounds 2–IV to 5–IV which are of the same formula as that of 1–IV except that the sulfonate or sulfate radicals of the anionic sulfonate or sulfate salts employed in these Examples 2–IV and 5–IV are respectively substituted for the sulfate radical of the formula of 1–IV.

*Examples 6–IV—7–IV*

425 parts of Reactant 2 in 650 parts of water. 300 parts of $C_{12}H_{25}-O-SO_3-Na$ in 450 parts of water and 320 parts of $C_{11}H_{23}C_6H_4-SO_3-Na$ in 450 parts of water respectively. Respective novel reaction products 6–IV and 7–IV of the following formulas $$\begin{array}{c} H \quad CH_2-CH_2-OH \\ \mid / \\ C_9H_{19}-C_6H_4-N \\ \quad \backslash \quad O \\ \quad \quad \parallel \\ C_{12}H_{25}-O-S-O_3 \quad CH_2-CH-CH_2-S-O-Na \\ \quad \mid \quad \parallel \\ \quad OH \quad O \end{array}$$

and $$\begin{array}{c} H \quad CH_2-CH_2-OH \\ \mid / \\ C_9H_{19}-C_6H_4-N \\ \quad \backslash \quad O \\ \quad \quad \parallel \\ C_{11}H_{23}-C_6H_4-SO_3 \quad CH_2-CH-CH_2-S-O-Na \\ \quad \mid \quad \parallel \\ \quad OH \quad O \end{array}$$

*Examples 8–IV and 9–IV*

450 parts of Reactant 2 in 700 parts of water. 350 parts of respective compounds $$C_{17}H_{33}-SO_3-Na$$

and $$C_{17}H_{33}-O-SO_3-Na$$

in 450 parts of water to produce novel reaction products 8–IV and 9–IV which are of the same formulas as that of reaction product 6–IV except that the respective sulfonate and sulfate radicals herein are substituted for the sulfate radical of product 6–IV.

Examples 10-IV and 11-IV 425 parts of Reactant 2 in 650 parts of water and 600 parts of Reactant 5 in 900 parts of water respectively. 400 parts of

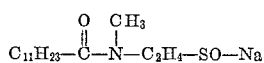

in 600 parts of water there are provided respective solutions of the following respective novel compounds 10-IV and 11-IV of the following respective formulas:

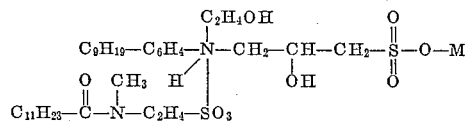

and

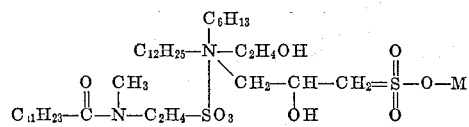

Examples 12-IV and 13-IV 300 parts of Reactants 3 in 450 parts of water and 400 parts of Reactant 6 in 600 parts of water, respectively. 370 parts of $C_{13}H_{27}$—O—$(C_2H_4O)_3$—$SO_3$—Na in 500 parts of water to provide aqueous solutions of novel reaction products 12-IV and 13-IV of the following formulas:

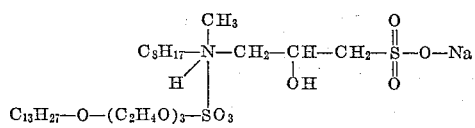

and

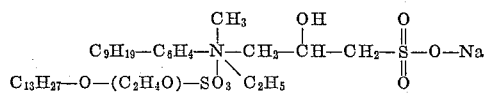

Examples 14-IV and 15-IV 500 parts of Reactant 4 in 750 parts of water, 310 parts of $C_{11}H_{23}$—COO—$C_2H_4$—$SO_3$—Na in 450 parts of water and 370 parts of $C_{11}H_{23}$—COO—$CH_2$—$CHOHCH_2$—O—$SO_3$—Na in 500 parts of water respectively. The novel respective novel reaction products 14-IV and 15-IV are:

and

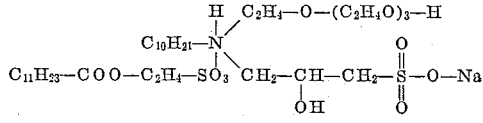

Examples 16-IV 500 parts of Reactant 4 in 750 parts of water. 350 parts of $C_{12}H_{25}$—O—$SO_3$—Na in 440 parts of water to provide novel reaction product 16-IV of the formula:

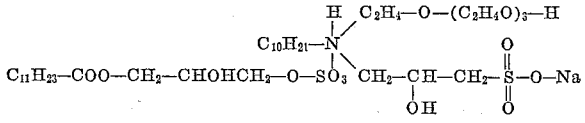

Example 17-IV 440 parts of Reactant 2 in 650 parts of water. 250 parts of $C_6H_{13}$—S—$C_2H_4O$—$SO_3$—Na in 400 parts of water to provide novel reaction product 17-IV of the same formula as that of Example 2 except that the sulfate radical herein is substituted for that of product 2-IV.

Example 18-IV 600 parts of Reactant 7 in 900 parts of water. 270 parts of $C_{12}H_{25}$—$SO_3$—Na in 400 parts of water to provide aqueous solution of novel reaction product 18-IV:

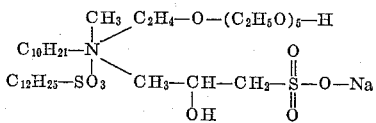

Example 19-IV and 20-IV 400 parts of Reactant 8 in 600 parts of water. 300 parts of $C_{12}H_{25}$—O—$SO_3$—Na in 450 parts of water and 350 parts of $C_{12}H_{25}$—S—$C_2H_4$—O—$SO_3$—Na in 500 parts of water to provide respective aqueous solutions containing novel reaction products 19-IV and 20-IV respectively:

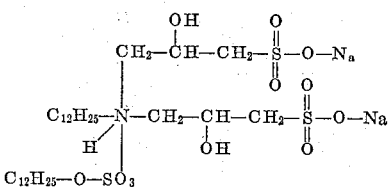

and

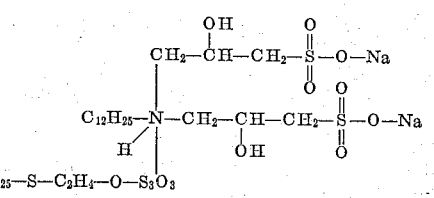

Example 21-IV-on

Employ about 1 mole proportion of all of the other specific compounds of Formulas IIIA and IIIB, some specifically described in Examples 1 to 20-on herein, respectively, in about one and one-half times its weight of water and about 1 mole proportion of any of the specific anionic surface active agents (G-$M_1$), respectively, in about one and one-half times its weight of water there are produced literally thousands of compounds of the Formula IV herein which compounds differ from the specific compounds of Examples 1-IV to 20-IV herein and are other specific compounds of the present invention. Specific illustrative examples of other anionic reactants are the other anionic sulfate and sulfonate salts disclosed in my U.S. Patent 2,781,349 and the following is at least a partial list thereof:

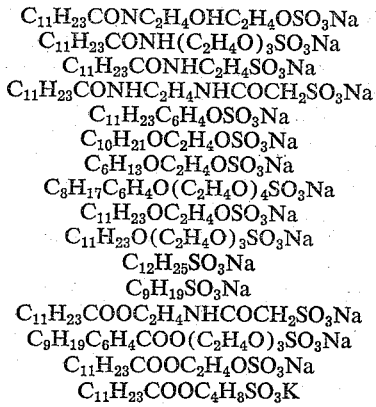

It is to be understood that as to the G radicals which terminate in X and the novel reaction products thereof when either $SO_3$ or $OSO_3$ is used in the specification or claims, it is meant to indicate either one or the other because of their equivalency and that the use of Na in compounds of this invention as set forth in the specification and claims is means to indicate it, hydrogen any of the other alkali metals or other cation equivalents which obviously may be substituted for sodium.

It is to be understood that the following claims are intended to cover all the generic and specific features of the invention herein described and all statements of the scope of the invention which as a matter of language might be said to fall therebetween.

I claim:

1. A compound of the formula selected from the group consisting of:

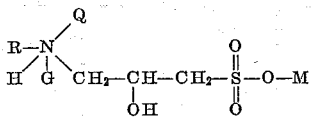

and

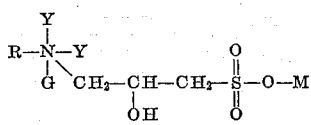

with R being a hydrocarbon radical selected from the group consisting of alkyl and ethylenically unsaturated aliphatic hydrocarbon radicals and alkyl substituted mononuclear aromatic radicals of 6–24 carbon atoms, with the alkyl portion thereof being of at least 3 carbon atoms; each Y is a radical selected from the class consisting of (a) alkyl radicals of 1–6 carbon atoms and (b) $-R_1-O-(R_1-O)_x-H$, with $R_1$ being an alkylene group of 2–4 carbon atoms and $x$ being 0–15; Q is selected from the group consisting of hydrogen, (a), (b) and

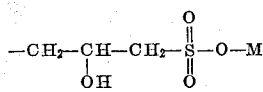

M is selected from the group consisting of hydrogen and alkali metals; and G is a radical selected from the group consisting of sulfonate radicals of organic anionic detergent sulfonic acid salts and sulfate radicals of organic anionic detergent sulfate, said sulfate and sulfonate radicals having a terminal hydrocarbon radical of 6–20 carbon atoms said terminal hydrocarbon radical being selected from the group consisting of alkyl, ethylenically unsaturated aliphatic hydrocarbon groups and alkyl substituted mononuclear aromatic radicals wherein the alkyl portion is at least 6 carbon atoms salts.

2. A compound defined in claim 1, with G being $R_f-O-SO_3-$, with $R_f$ being a hydrocarbon radical selected from the group consisting of alkyl and ethylenically unsaturated aliphatic hydrocarbon radicals of 6–20 carbon atoms and alkyl substituted mononuclear aromatic hydrocarbon radicals with a maximum of 20 carbon atoms and having at least 6 carbon atoms on the alkyl portion thereof.

3. A compound defined in claim 1, with G being $R_1-O-(C_2H_4O)_y-SO_3-$, with $R_f$ being a hydrocarbon radical selected from the group consisting of alkyl and ethylenically unsaturated aliphatic hydrocarbon radicals of 6–20 carbon atoms and alkyl substituted mononuclear aromatic hydrocarbon radicals with a maximum of 20 carbon atoms and having at least 6 carbon atoms on the alkyl portion thereof; and $y$ being 1–10.

4. A compound as defined in claim 1, with G being a radical selected for the group consisting of:

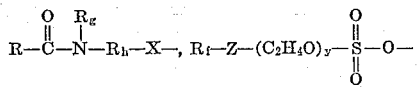

$R_f-X-$ and $R_f-COO-R_k-X-$; R is as defined in claim 1; $R_f$ is a hydrocarbon radical selected from the group consisting of alkyl and ethylenically unsaturated aliphatic hydrocarbon radicals of 6–20 carbon atoms and alkyl substituted mononuclear aromatic radicals having a maximum of 20 carbon atoms, wherein the alkyl portion is at least 6 carbon atoms; $R_g$ is selected from the group consisting of hydrogen, and alkyl radicals of 1–8 carbon atoms, hydroxy alkyl radical of 2 carbon atoms; $R_h$ is selected from the group consisting of alkylene groups of 1–12 carbon atoms, phenylene and alkylene oxide groups of 1–12 carbon atoms; $R_k$ is selected from the group consisting of alkylene groups of 1–12 carbon atoms; Z is selected from the group consisting of oxygen and sulfur; X is selected from the group consisting of:

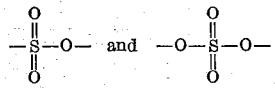

and $y$ is 1–10; said alkylene oxides being of 2–4 carbon atoms.

5. A compound defined in claim 1, with Q being

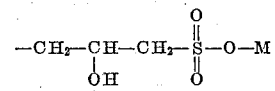

6. A compound of the formula:

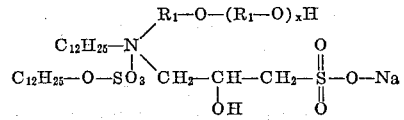

with $R_1$ being an alkylene radical of 2–4 carbon atoms; and $x$ is 0–15.

7. A compound of the formula:

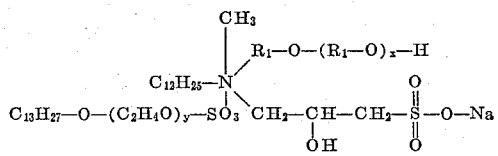

with $R_1$ being alkylene radical of 2–4 carbon atoms, $x$ being 0–15, and $y$ being 1–10.

8. A compound of the formula:

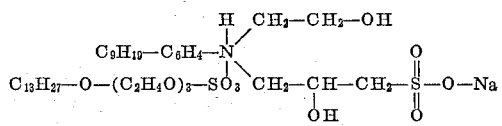

References Cited by the Examiner

UNITED STATES PATENTS

| | | | |
|---|---|---|---|
| 1,944,300 | 1/34 | Ott et al. | 260—508 |
| 2,210,175 | 8/40 | Muncie | |
| 2,781,358 | 2/57 | Mannheimer | 260—458 |
| 2,781,372 | 2/57 | Mannheimer | 260—457 X |
| 2,781,388 | 2/57 | Mannheimer | 260—458 |
| 2,781,390 | 2/57 | Mannheimer | 260—458 |
| 2,832,795 | 4/58 | Hempel et al. | 260—458 |

OTHER REFERENCES

Tsunoo, Berichte Deut. Chem. Vol. 68, 1334–1341 (1935).

CHARLES B. PARKER, *Primary Examiner.*